Figure 9:
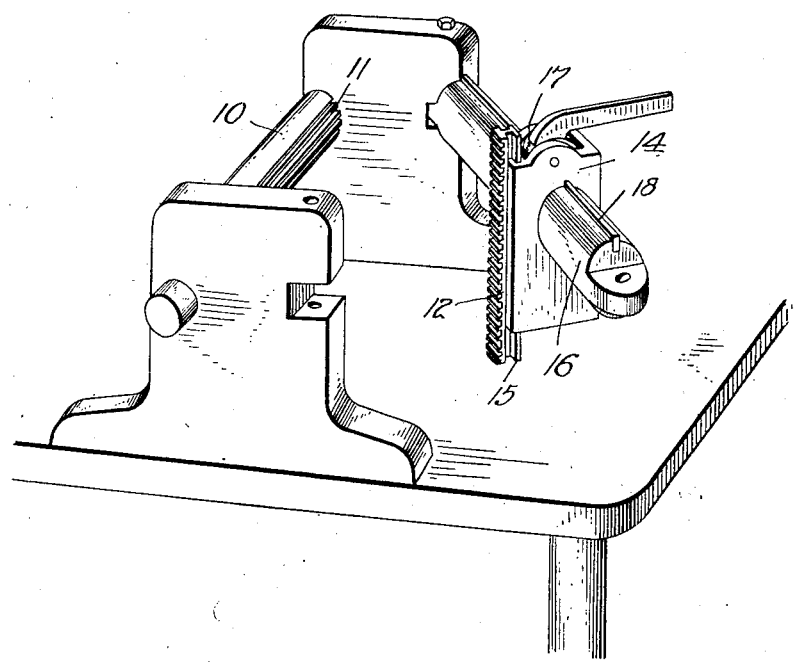

No. 826,394. PATENTED JULY 17, 1906.
R. G. WHITLOCK.
PUNCHING MACHINE.
APPLICATION FILED JUNE 1, 1904. RENEWED MAR. 19, 1906.
3 SHEETS—SHEET 1.
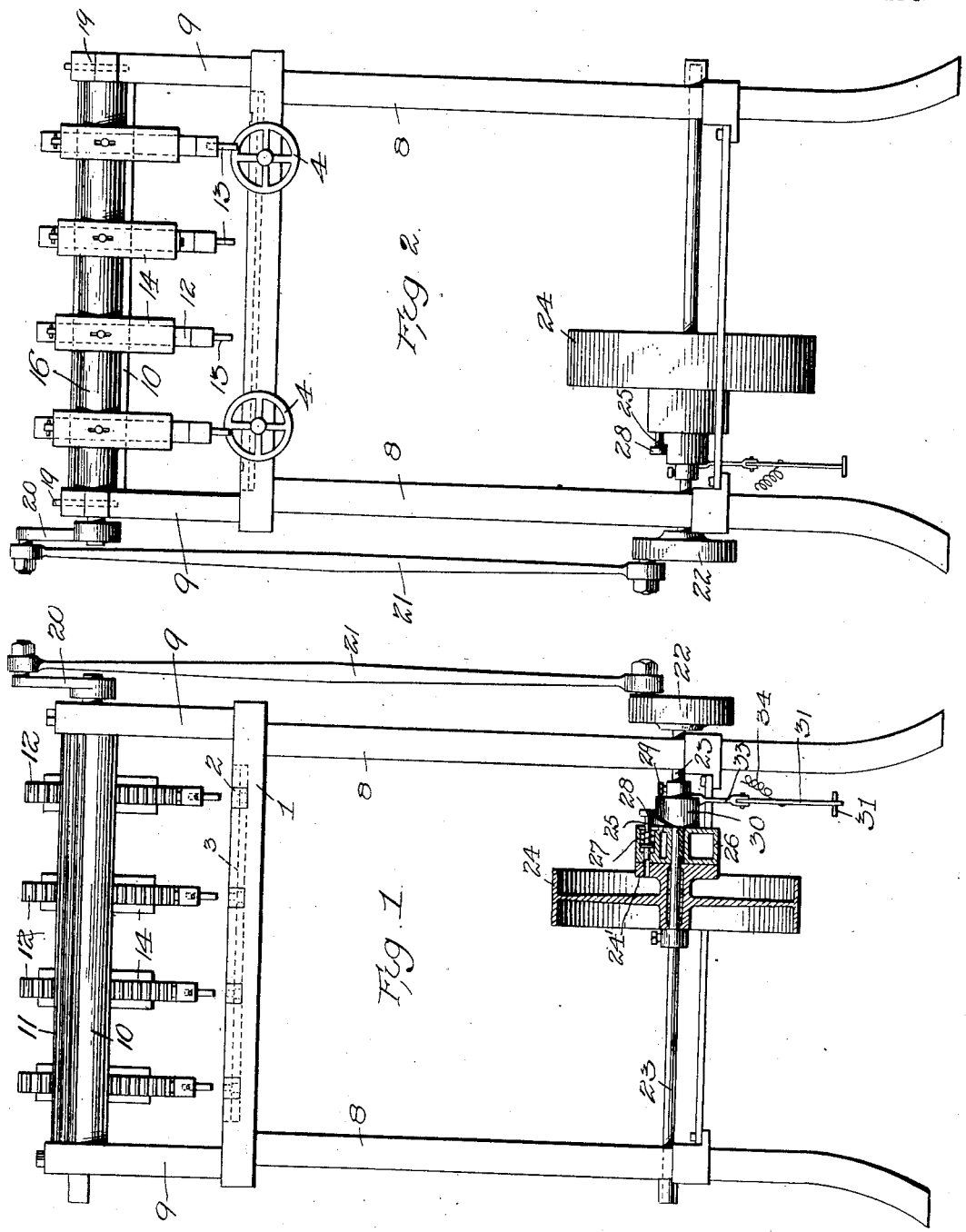
Witnesses
W. Madleton
Edward Sarton
Inventor
RALPH G. WHITLOCK.
by Spear Madleton Donaldson & Spear
Attorney's.

No. 826,394. PATENTED JULY 17, 1906.
R. G. WHITLOCK.
PUNCHING MACHINE.
APPLICATION FILED JUNE 1, 1904. RENEWED MAR. 19, 1906.
3 SHEETS—SHEET 2.
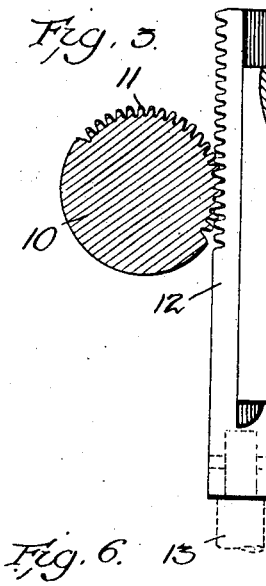
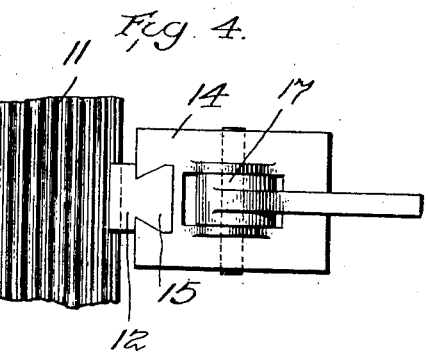
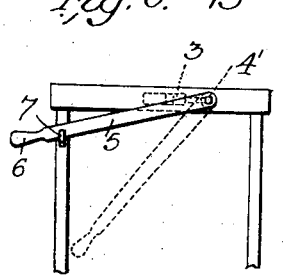
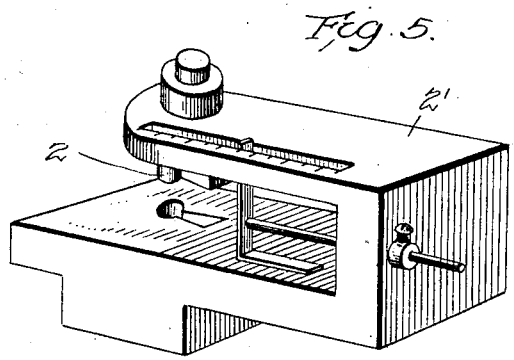
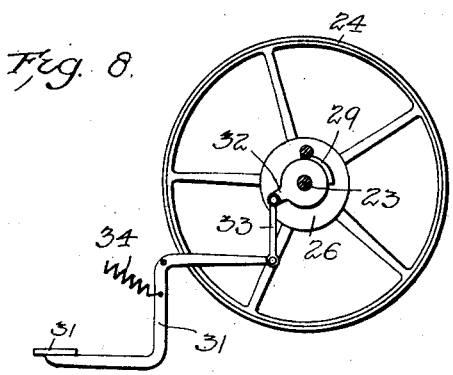
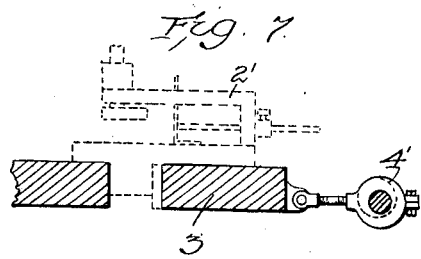
ATTEST:
O. S. Middleton
Edward Sarton
INVENTOR.
RALPH G. WHITLOCK.
by Spear Middleton Donaldson & Spear
ATTY'S No. 826,394. PATENTED JULY 17, 1906.
R. G. WHITLOCK.
PUNCHING MACHINE.
APPLICATION FILED JUNE 1, 1904. RENEWED MAR. 19, 1906.

3 SHEETS—SHEET 3.

UNITED STATES PATENT OFFICE.

RALPH G. WHITLOCK, OF LOS ANGELES, CALIFORNIA.

PUNCHING-MACHINE.

No. 826,394.           Specification of Letters Patent.           Patented July 17, 1906.

Application filed June 1, 1904. Renewed March 19, 1906. Serial No. 306,906.

*To all whom it may concern:*

Be it known that I, RALPH G. WHITLOCK, a citizen of the United States, residing at Los Angeles, California, have invented certain new and useful Improvements in Punching-Machines, of which the following is a specification.

My invention relates to apparatus for punching, perforating, round-cornering, or tag-cutting, and it includes the features and combination and arrangement of parts hereinafter described, and particularly pointed out in the claims.

In the accompanying drawings, Figure 1 is a front view of the apparatus; Fig. 2, a rear view; Fig. 3, a vertical sectional view taken across the gear-bar and sleeve-bar. Fig. 4 is a plan view of part of the gear-bar and guide-block, and Fig. 5 is a detail relating to the dies. Fig. 6 is a detail relating to the means for operating the vise-jaws. Figs. 7 and 8 are details. Fig. 9 is a perspective view showing the bar which carries the punches and guides thrown back in relation to the gear-bar.

In the drawings, 1 indicates a table carrying dies 2, Fig. 5, of suitable form to accomplish the work desired. These dies are supported in casings 2', which are held in place in the table by a clamp-bar 3, Figs. 6 and 7, which may be held in place by screws operated by hand-wheels 4, Fig. 2, or, as shown in Fig. 6, the clamp-bar 3 may be operated by a cam 4' in rear thereof, which cam is connected with a lever 5, having a handle 6, by which it is operated. When the handle is up, as indicated in full lines, and is held by the lug 7, the vise-jaw or clamp-bar 3 is pressed forwardly against the dies and holds them firmly, and by letting the handle drop, as shown in dotted lines, the vise-jaw is released and is drawn away from the dies. The die-table is supported upon suitable standards 8, and posts or standards 9 extend up from the die-table and have journaled therein a gear-bar or cylinder 10, which extends across from side to side of the machine and has gear-teeth extending continuously from end to end thereof. These gear-teeth 11 mesh with rack-bars 12, which at their lower end carry the punches or cutters 13.

In order to support and guide the rack-bars, I provide guide-blocks or sleeves 14, having dovetail guideways adapted to receive the dovetails 15 of the rack-bars. These sleeves are in turn supported by a sleeve-bar 16, which extends from one standard or post 9 to the other and opposite to and parallel with the gear-bar 10. The sleeves are adjustably supported on said sleeve-bar and may be held in any desired position along the same by means of the clamps 17, pivoted to the sleeves and pressing on a key 18, engaging a groove in the sleeve-bar.

It will be noticed that as the gear-bar or cylinder has its teeth extending continuously from end to end the sleeves may be readily adjusted, in which action the teeth of the rack-bars will move longitudinally of the teeth in the gear-bar, and thus the punches may be disposed at any desired point laterally of the machine.

The sleeve-bar is supported on the frame by means of taper pins 19, and by removing one of these pins the said sleeve-bar may be swung on the other taper pin as a pivot, and thus access may be had to the rack-bars for the removal of the sleeves or guide-blocks and the rack-bars, for it will be obvious that by swinging the sleeve-bar on its pivot the rack-bars will be thrown out of engagement with the teeth of the gear-bar.

In order to operate the gear-bar, I provide an arm 20, secured to its end which is connected by a pitman 21 with a crank-disk 22 on a shaft 23, which is driven through a belt-wheel 24. This belt-wheel is loose on the shaft and is provided with a collar 24', having an opening adapted to receive a pin 25, passing through a disk or block 26, fixed to the shaft, the said pin being under the tension of a spring 27 and having its head 28 adapted to engage a wedge or incline 29 on a collar 30, which collar is loose on the shaft and is controlled by a foot-lever 31, connected to an arm 32 of said collar by a link 33, a spring 34 being provided to return the parts after operation. After performing one revolution the head of the pin will ride on the wedge or incline 29 and will be withdrawn from the hole in the collar of the belt-wheel 24, and the action of the machine will cease when the pin rides on the incline, and in order to start the machine again the foot-lever is pressed and the collar is turned to throw the incline beyond the head of the pin. The pitman 21 may be adjusted in the crank-disk, as indicated.

The key 18, while permitting free adjustment of the guide-block or sleeve along the bar 16, serves to prevent the sleeve from turning about the said bar, and this holds the rack-bar vertical. This effect is also aided by the key 18' engaging a groove in the bottom of the bar.

It will be understood that the oscillation of the gear-bar results from the relative length of the cranks 20 and 22.

I claim as my invention—

1. In a punching-machine, the combination of a gang of punches, a gear-bar toothed from end to end, means for oscillating the said bar, bars carrying the punches and arranged opposite the periphery of the gear-bar and having teeth to mesh therewith, guides in which the punch-carrying bars slide, said guides being adjustable individually toward and from each other and along the toothed gear-bar, substantially as described.

2. In combination, a series of rack-bars carrying punches, means for operating the said rack-bars and a hinged bar carrying the said rack-bars and adapted to be swung aside to withdraw the rack-bars from their operating means, substantially as described.

3. In combination, a gear-bar having teeth extending from end to end, rack-bars carrying punches engaging the said gear-bar, guides or sleeves for guiding the rack-bars, and a bar extending parallel with the gear-bar, and holding the sleeves, said sleeves being individually adjustable toward and from each other, substantially as described.

4. In combination, a gear-bar toothed from end to end, a series of rack-bars engaging the said gear-bar, guides or sleeves for the rack-bars, a bar extending parallel with the gear-bar and adjustably holding the guides or sleeves, and means for pivotally supporting the said sleeve-bar, substantially as described.

5. In combination, a toothed bar, a rack-bar engaging the toothed bar, a block having a way in which the said rack-bar is guided, a bar passing through the guide-block and to which the said guide-block is splined and means for clamping the guide-block to the said bar, substantially as described.

6. In combination, a toothed bar, a rack-bar engaging the toothed bar, a block having a way in which the said rack-bar is guided, a bar passing through the guide-block, a key-and-groove connection between the said bar and guide-block, and a clamp acting on said key to press the same into the groove and hold the guide-block in any position along the said bar, substantially as described.

In testimony whereof I affix my signature in presence of two witnesses.

RALPH G. WHITLOCK.

Witnesses:
S. K. ELLIOTT,
J. LANDRUM GRAHAM.